No. 638,390. Patented Dec. 5, 1899.
W. W. HANSCOM & A. HOUGH.
STORAGE BATTERY.
(Application filed Apr. 6, 1899.)
(No Model.)
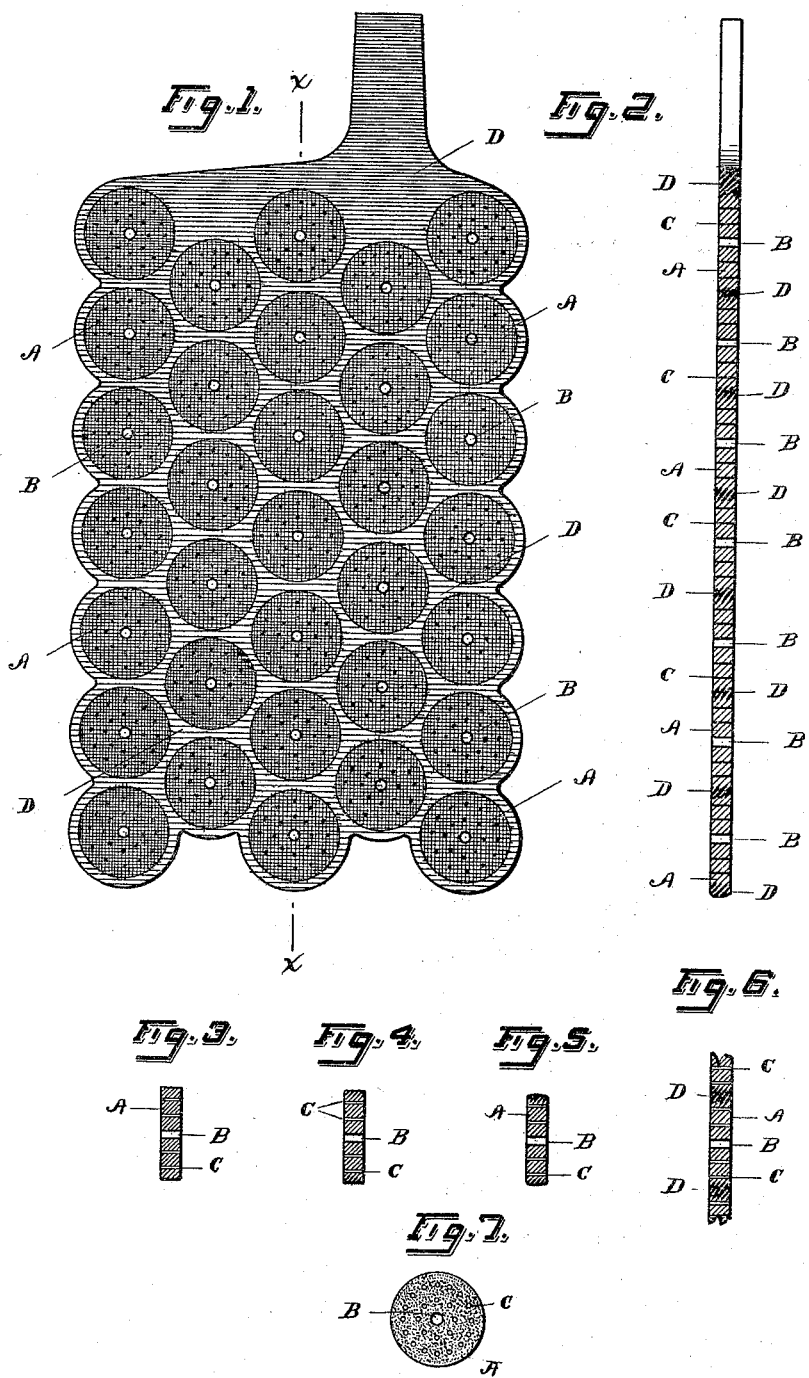

UNITED STATES PATENT OFFICE.

WILLIAM W. HANSCOM AND ARTHUR HOUGH, OF SAN FRANCISCO, CALIFORNIA.

STORAGE BATTERY.

SPECIFICATION forming part of Letters Patent No. 638,390, dated December 5, 1899.

Application filed April 6, 1899. Serial No. 711,994. (No model.)

*To all whom it may concern:*

Be it known that we, WILLIAM W. HANSCOM, a citizen of the United States, and ARTHUR HOUGH, a subject of Great Britain, both residing at San Francisco, in the county of San Francisco and State of California, have invented certain new and useful Improvements in Storage Batteries; and we do hereby declare the following to be a full, clear, and exact description of said invention, such as will enable others skilled in the art to which it most nearly appertains to make, use, and practice the same.

This invention relates to improvements in storage batteries and to the method of constructing the plates of the same.

In a patent of the United States, No. 593,803, dated the 16th day of November, 1897, which was granted to us, the active material was described as constructed of a mixture of litharge, sugar, and sulfate of ammonia, which was formed into a paste, molded in shape, and permitted to set or harden. The set or hardened blocks were then electrolytically reduced to spongy lead. The edges of these blocks were then pressed transversely or upon both faces of the blocks to compress the edges into a condition of or resembling metallic lead, to which the frame or support of the plate was subsequently welded.

In the present invention the active material is constructed of the same components and the edges of the active material are compressed to the metallic condition to be welded to the frame or support; but the manner in which the litharge, sugar, and sulfate of ammonia are combined and the manner of compressing the edges of the blocks of active material are improved to facilitate and cheapen the construction, to increase the proportion of the active material in the finished plate, and to expose the entire surface of the active material to the electrolyte.

As a further improvement the active material is provided with a series of perforations into and through which the electrolyte is permitted to flow or circulate, with the effect of exposing an additional amount of surface of the active material.

In the drawings, Figure 1 is a side elevation of a plate constructed in accordance with this invention. Fig. 2 is a vertical section of the same, taken on the line X X. Fig. 3 is a cross-section of the pellet, showing its condition after being molded and set. Fig. 4 is a cross-section of the pellet, showing its condition after being reduced to spongy lead on the edge, the heavier shading being used to indicate the reduced material. Fig. 5 is a cross-section of the pellet, showing its condition after the spongy lead has been compressed, the heavy solid lines on the outer edge being used to indicate the compressed lead. Fig. 6 is a cross-section in detail of a portion of the plate, showing the pellet held in the support or frame. Fig. 7 is a detail side view of one of the pellets of active material in the condition ready to be incorporated in the plate.

In employing the method herein set forth a plate or electrode having the shape in side elevation shown in Fig. 1 of drawings is produced as a preferred form and as the more readily adapting itself to that step in the method by which the edges of the pellets are compressed. The active material is here shown as in the form of rounded pellets A. These pellets are produced in the manner as follows: Dry powdered litharge is poured into a mold adapted to produce a round disk-like shape. The mold used is preferably cylindrical in form and open at both ends for the dislodgment of the pellet after the same is pressed. The cylinder is formed long enough to leave its upper edge above the powdered litharge after the proper quantity is poured into the cylinder. The purpose in this is that the cylinder is calculated to hold the sulfate of ammonia and sugar, which are mixed and made into a solution of the desired strength. This solution quickly permeates the powdered litharge and is taken up thereby. A plunger is then inserted in the cylinder and the proper pressure applied, which forms the mass into a pellet which is solid enough to handle sufficiently to be removed from the cylinder and placed in drying-racks. When dried, the pellets will be found to be set and hardened, but porous.

The chemical action which has transpired is set forth in the patent above referred to and consists in the sugar and lead combining in the presence of ammonia to form a sucrate of lead, which when electrolytically reduced becomes spongy and tough.

When dry, the large central perforation B and the small circulation-perforations C are formed in the pellets. The perforations B are provided to permit the pellets to be placed on a suitable metallic rod in series or piled one on another to be placed in the electrolyte to be electrolytically reduced. We have found that by wrapping the aggregated pellets with a continuous wire about the outside and connecting the wire in the charging-circuit a rapid reduction of the outer edge of the pellets may be effected. This, however, is not essential, as the current may be conveyed through the central rod. When the pile of pellets has been reduced on its outer surface, which is the edges of the individual pellets, and this reduction has extended inward toward the center of the pile or center of the pellets for about one-eighth of an inch, the pile is removed and the pellets are ready for the next step in the method, which is the compressing the spongy lead to which the edges of the pellets have been reduced. This is accomplished by clamping the pellets on a mandrel or rotating machine and pressing a suitable roller against the edge while the pellet is rotated. This compresses the spongy lead. By using a roller having an edge concave in cross-section for pressing the edge of the pellets they are given a convex shape in cross-section. This shape of the edge of the pellets adapts itself the better to be held in the frame D should there be a failure of the edge of the pellets and frame D to weld. The shape would permit the lead of the frame to flow about the rounded edge.

When a sufficient number of pellets A have been provided, in the manner described, they are set in a mold and spaced therein, so that they nest together as closely as possible to permit the molten lead of the frame D to flow around and about them. The spaces between the pellets are made as narrow as possible to have as little lead in the frame as will serve the purpose of supporting the plate and convey the current away from the pellets. The frame D is formed by heating the lead of which it is formed to a great heat and pouring it into the mold, which is shaped to give the shape shown in the drawings. The heat of the lead is sufficient to melt the edges of the pellets and cause a weld between the same and the frame. This weld forms practically an integral union of the frame and pellets and removes the possibility of the formation of sulfate of lead between the active material and the frame.

By the construction thus far described there is produced a plate in which the active material is set in a frame or support and is joined to the frame by an integral or welded joint. Also the entire surface of the pellets of active material is exposed to the electrolyte and not, as heretofore, partly covered by the frame D.

To provide for a more thorough and complete contact between the electrolyte and pellets, the latter are provided with perforations C, which in the drawings are shown as extending through the pellets A. By this construction the entire body of the pellets is subjected to the action of the electrolyte, and thereby equalizing the charge and discharge from the same. These perforations G may be formed by pins left in the mold or bored in the pellets after the pellets are hardened or set.

Having thus described this invention, we claim—

1. The method of manufacturing electrodes for storage batteries consisting in placing dry powdered litharge in suitable molds, then moistening the said litharge with a solution of sugar and sulfate of ammonia; then pressing the said moistened litharge to form a hardened pellet; then drying the said pellet; then reducing the edge of the pellets to spongy lead by electrolysis; then pressing the edge of the pellets; then assembling the said pellets; and then casting a metallic-lead frame or support about the edges of the assembled pellets said lead being heated sufficient to melt the pressed edges of the said pellets, substantially as described.

2. The method of manufacturing electrodes for storage batteries consisting in placing dry powdered litharge in suitable molds; then moistening the said litharge with a solution of sugar and sulfate of ammonia; then pressing the said moistened litharge to form a hardened pellet; then drying the said pellets; then assembling the said pellets by laying the sides of the same together and exposing the edges; then partly reducing the assembled pellets to spongy lead by electrolysis; then pressing radially the edges of the pellets; then assembling the said pellets in the arrangement they are to assume in the electrode; and then casting a metallic-lead frame or support about the edges of the pellets said lead being heated sufficient to partly melt the pressed edges of the said pellets, substantially as described.

3. The method of manufacturing electrodes for storage batteries consisting in placing dry powdered litharge in suitable molds; then moistening the said litharge while in the mold with a suitable solution; then pressing the said moistened litharge to form a hardened pellet; then drying the said pellets; then assembling the said pellets in the form of a column by laying the pellets one on another with their sides abutting and their edges exposed; then placing the column in an electric circuit by connecting a terminal to the outside of the column and passing a current of electricity through it while in a suitable electrolyte to reduce the outside of the column or the edges of the pellets prior to the body of the pellets; then pressing the edges of the pellets; then assembling the said pellets in the arrangement they are to assume in the electrode; and then casting a metallic-lead frame or support about the edges of the said pellets, said lead being heated sufficiently to partly melt the pressed edges of the pellets, substantially as described.

In testimony whereof we have hereunto set our hands this 3d day of March, 1899.

WILLIAM W. HANSCOM.
ARTHUR HOUGH.

Witnesses:
BALDWIN VALE,
E. F. MURDOCK.